Nov. 26, 1957        H. R. FIFER        2,814,303
LIQUID DISPENSING DEVICE AND METHOD
Filed Nov. 23, 1953
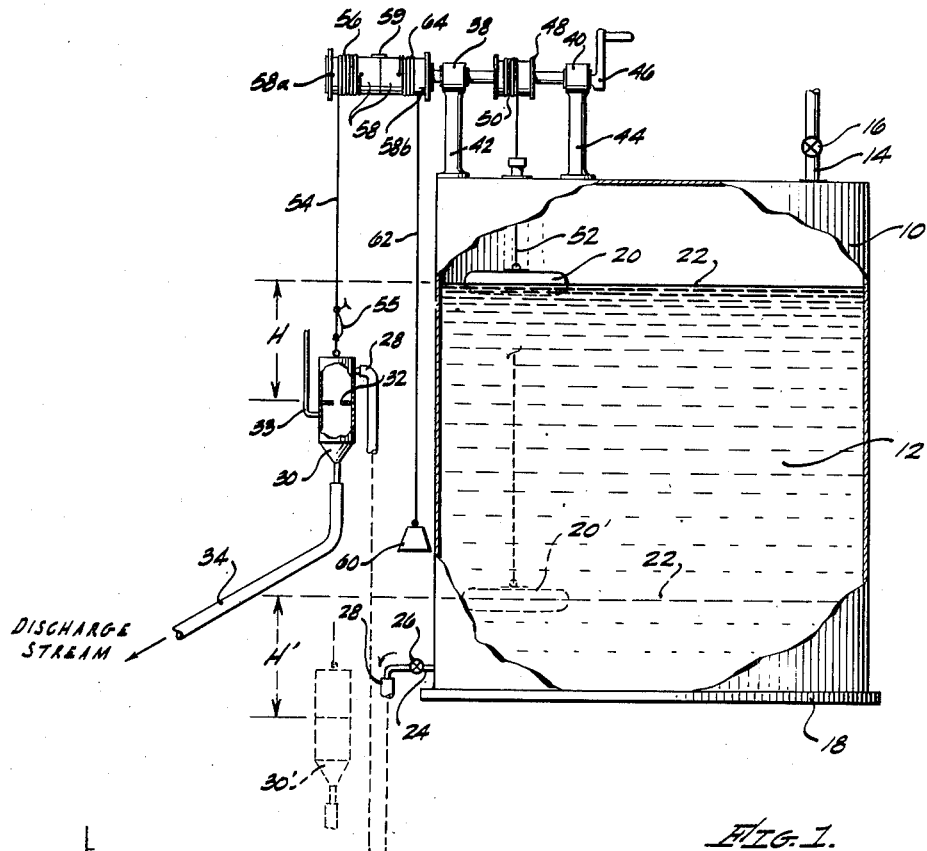
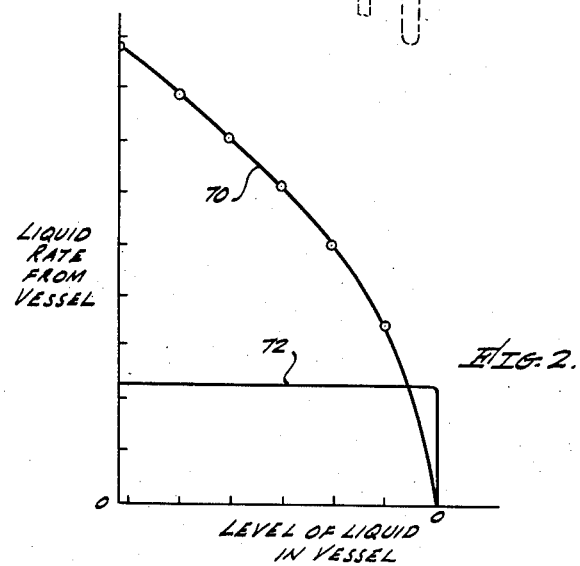
INVENTOR.
HARVEY R. FIFER,
BY
AGENT.

United States Patent Office 2,814,303
Patented Nov. 26, 1957

2,814,303

LIQUID DISPENSING DEVICE AND METHOD

Harvey R. Fifer, Huntington Park, Calif., assignor, by mesne assignments, to Brea Chemicals, Inc., a corporation of California Application November 23, 1953, Serial No. 393,812

9 Claims. (Cl. 137—8)

This invention relates to devices for the regulation of fluid flow and in particular is directed to an apparatus adapted to deliver a constant rate of liquid discharge from a vessel containing liquids to be dispensed, the constant flow rate being maintained in spite of the change in liquid level within the vessel.

In many operations the dispensing of liquids is desirably maintained at a constant rate. Such operations include those involving water treating, the formation of solutions of liquids, and the blending of liquids in various proportions. As a specific example of the latter type of process, the blending of ammonium hydroxide (aqua ammonia) with irrigation water to add nitrogen to the soil may be cited. There are obviously many other situations in which such constant flows of liquids are desirable.

It is well-known that the rate of fluid discharge from a tank through an orifice of constant area located near the tank bottom is far from constant. The flow rate is proportional to the cross-sectional area of the orifice and the square root of the hydrostatic liquid head so that even if the orifice area is kept constant, the discharge of liquid lowers the liquid level thereby decreasing the hydrostatic head which in turn decreases the discharge rate. The relationship existing between discharge or flow rate, the orifice area, the type of orifice, and the hydrostatic liquid head is given as follows:

$$q = \frac{cS_o\sqrt{2gH}}{\sqrt{1 - \frac{S_o^2}{S_1^2}}}$$

wherein $q$ is the volumetric flow rate, $c$ is the orifice coefficient, $S_o$ is the cross-sectional area of the orifice, $g$ is the acceleration of gravity, $H$ is the hydrostatic head at the orifice, and $S_1$ is the cross-sectional area of the conduit upstream from the orifice, all in consistent units. Where $S_o$ is small relative to $S_1$, the denominator may be disregarded. It is clear from the equation that the only variable is the hydrostatic head $H$ since other factors are fixed either when the apparatus is constructed or placed in operation.

Numerous attempts have been made to maintain a constant flow rate $q$ in spite of variations in hydrostatic head $H$. Most of these have involved the use of floats having movable orifices and disposed within the vessel from which the constant liquid rate of discharge is desired. While such apparatus will effectively deliver substantially constant liquid discharge rates, the collection of floats, gates, orifices, tubes, and supported members within the tank itself gives rise to many maintenance and operation difficulties. Among these include rusting of the movable parts, plugging of the orifices, extreme difficulty of reliable lubrication, and other maintenance problems of the submerged moving elements.

The present invention is directed to an apparatus in which these difficulties have been avoided and in which a constant liquid discharge is obtained wherein only a float member is movable within the liquid vessel.

It is a primary object of the present invention therefore to provide a simple mechanical means for the dispensing of liquids from a vessel at a constant flow rate regardless of changes in level of the liquid within the vessel.

It is a further object of this invention to provide such a liquid dispensing apparatus in which a minimum of moving mechanical elements is employed and in which all of such elements are located in easily accessible positions for simplified maintenance.

Other objects and advantages of the present invention will become apparent to those skilled in the art as the description thereof proceeds.

Briefly, the present invention comprises an apparatus for dispensing liquids at constant volumetric rates which comprises a vessel adapted to contain a body of liquid to be dispensed and provided with an inlet, an outlet opening for liquid to be discharged, a flexible tubular connection between said outlet and a movable discharge orifice, said orifice being suspended externally of said vessel by means adapted to permit its vertical movement, which means is actuated by a float member situated within the vessel and adapted to follow the liquid level as it drops through discharge of liquid from the vessel. The means for supporting the movable discharge orifice and which is actuated by the said float is adapted through a relatively simple mechanical means to the maintenance of the discharge orifice at a constant but adjustable distance below the liquid level within the tank at all times. Thus, as the liquid level within the vessel is lowered by liquid discharge, the float within the vessel follows the liquid level as it drops and thereby lowers the movable discharge orifice at an equal rate to maintain a substantially constant effective hydrostatic head of liquid at the orifice. On reference to the equation above, it will be seen that if the hydrostatic head H is thus maintained constant, the liquid flow rate $q$ is also constant.

The apparatus of this invention, which is described in greater detail below, is highly flexible in operation because it is provided with a vertically movable orifice contained in an orifice housing or head. An extremely wide variation in the constant liquid discharge rates obtainable is permitted due to the fact that any desirable sized orifice may be employed, and in fact the orifice may be made adjustable in size, and also the fact that the discharge orifice head may be suspended only slightly below or at substantial distances below the liquid level within the tank. This distance may even exceed the depth of the tank such as in those cases where the tank or vessel is supported on a tower or other structure. With relatively large orifices and the positioning of the discharge of the orifice head at a substantial distance below the liquid level, very high and constant discharge rates are attained.

The present invention will be more readily understood by reference to the accompanying drawing in which:

Figure 1 is a semi-schematic elevation view in partial cross section of the apparatus of this invention, and Figure 2 is a plot showing the variation in liquid rate from the vessel as a function of liquid level therein, both for the conventional system and in the present invention.

Referring now in particular to Figure 1, the apparatus includes vessel 10 in which a body of liquid 12 is contained. The vessel is provided with inlet conduit 14 having a valve 16 through which the tank or vessel is filled. Vessel 10 is supported on any type of suitable support 18. The only portion of the equipment located within the vessel is a movable weighted float 20 which may be raised by line 52 and which follows the downward movement of the liquid level 22 when liquid is discharging from vessel 10.

The discharge outlet from vessel 10 is conduit 24 provided with shutoff valve 26. Conduit 24 continues through flexible tube 28 which connects to a vertically movable orifice housing 30 containing orifice 32. The effective hydrostatic head at orifice 32 depends upon the distance H between orifice 32 and liquid level 22. This distance may be varied by suitable adjustment as discussed above, but is fixed and constant during operation. The liquid discharging through orifice 32 passes from orifice housing 30 at a constant rate through discharge outlet 34 and is passed to any subsequent treatment in which a constant liquid flow rate is required. Vent line 33 is provided to prevent siphon effects in discharge line 34 from interfering with the actual hydrostatic head at and the liquid flow through the orifice.

In the lower portion of the Figure 1 is shown liquid level 22' existing after a substantial quantity of the liquid contents of vessel 10 have discharged. The movable float here indicated as 20' is shown at the low level position. Discharge orifice housing 30' is shown at its lower position and at a distance H' (equal to H) below liquid level 22'. Thus, in spite of the lowered level and the decreased distance between the liquid level and outlet conduit 24, the liquid discharge rate from the system is always the same because the orifice area and the hydrostatic head are kept constant.

The automatic mechanical lowering of the movable orifice housing 30, whereby a constant hydrostatic head is maintained at orifice 32, is obtained by means of the cable drum apparatus shown in the upper left of Figure 1. A single horizontal shaft 36 is provided. This shaft is supported by journal bearings 38 and 40 and bearing supports 42 and 44. The shaft is further provided with crank means 46 for raising float 20 and orifice housing 30 prior to filling vessel 10. Shaft 36 is additionally provided with one or more cable drums of equal diameter. In the present modification two drums are shown, drum 48 being provided with winding 50, from which weighted float 20 is suspended by means of cable 52, and drum 58 described below. Thus as liquid level 22 drops, the buoyant support of the liquid is decreased at float 20 causing a net downward weight to be applied to cable reel 48 thereby turning shaft 36. The weight of float 20 is discussed below.

As shaft 36 turns, an equal length of movable orifice housing support cable 54, wound in the same direction as winding 50 on drum 48, is unwound from winding 56 on drum 58. This causes orifice housing 30 to move downward at a rate equal to the rate at which liquid level 22 and weighted float 20 are lowered thereby maintaining a constant vertical distance H between discharge orifice 32 and liquid level 22.

Since cables 52 and 54 unwind in the same direction, the weight of orifice housing 30 and cables 52 and 54 is counter-balanced by weight 60 supported by cable 62 from drum 58. Cable 62 is wound in winding 64 in the opposite direction from windings 50 and 56. Thus as the liquid level falls, weight 60 rises. Weight 60, cable 62, and winding 64 may be sustituted with a friction brake if desired. The apparatus is adjusted to a counter-balance so that the net weight of weighted float 20 is sufficient to unwind the cable drums when the buoyant forces acting on float 20 are removed due to a liquid level decrease.

In the design of this apparatus for a given application, the weight of float 20 is calculated to be sufficient to overcome friction in the cable drum shaft system. Then from this required weight and a consideration of the liquid density, the required volume of the float is determined to give it sufficient buoyancy to float. As the float drops the cables unwind and weight of the orifice head system assists the lowering of the orifice at a rate equal to that of the liquid level. The desired liquid discharge rate is usually known within certain limits and from this in the equation given above, suitable corresponding values of H hydrostatic head and $S_o$ orifice area are determined. The cable drum or drums are of uniform outside diameter to provide the uniform movement of the float and orifice.

The crank mechanism or its equivalent is provided to raise the float and orifice head before refilling with liquid.

Referring now to Figure 2, two curves 70 and 72 are shown comparing the variation in liquid discharge rate of a vessel having an ordinary discharge orifice at the bottom (curve 70) with the constant discharge rate from the apparatus above described (curve 72). In Figure 2, the volumetric liquid rate is plotted against the liquid level in the vessel. Curve 70 represents the ordinary variation in rate showing the high liquid rate with high levels of liquid. The rate decreases rapidly, approaching zero at zero liquid level. Curve 72 indicates the constant liquid rate obtainable in the apparatus of this invention for all liquid levels. The liquid rate is constant to and including zero liquid level in the vessel because when liquid level 22' reaches the same level as outlet conduit 24, there is still a hydrostatic head H effective at the discharge orifice because the discharge orifice housing at that time reaches a level below discharge outlet 24 by a distance of H. Distance H' is equal to distance H. With the usual discharge rates, conduit 28 empties relatively rapid causing the discharge rate to abruptly fall to zero a short time after the liquid level reaches outlet 24.

To place the apparatus of Figure 1 again in operation after a substantially complete discharge of the contents of vessel 10, or to place the apparatus in initial operation, float 20 is raised to a point adjacent the top of vessel 10 by winding up the cables and the liquid to be dispensed is introduced through line 14 to raise level 22 to any desired point. Float 20 is then lowered to intercept level 22 at which point the buoyant forces of the liquid counteract its weight. Discharge orifice housing 30 is then positioned at the desired distance H below liquid level 20 so as to produce the desired liquid discharge rate which, as stated above, is also a function of the open area $S_o$ of orifice 32.

The adjustment of this difference in level between liquid level 22 and the elevation of orifice 32 may be effected by any convenient mechanical means. One such means is by providing additional cable 54 so that for a given position of drum 58 the housing 30 may be adjusted in position by taking up or providing additional slack cable 55. Another such means involves the provision of a third cable drum to hold cable winding 56 separate from winding 64. This is indicated generally in Figure 1 in which drum 58 is split into two parts. The left-hand part 58a carrying winding 56 and the right-hand part 58b carrying winding 64 are rotatable with respect to one another to raise or lower housing 30. When the appropriate differential elevation H is obtained, the left and right-hand portions of drum 58 are locked together by means of lock 59 and the operation of the apparatus continues as described above.

As an example of the present invention applied to the distribution of aqueous ammonia solutions into irrigation water, the following data are pertinent. An appropriately sized tank is 25 feet 9 inches in diameter and 25 feet 9 inches high and capable of containing approximately 100,000 gallons of about 27% aqueous ammonia. For an aqueous ammonia flow of about 175 gallons per hour, a sharp edged orifice 2.21 inches in diameter is employed and adjusted at a distance of 9 feet below the liquid level. Upon opening the discharge outlet valve, the aqueous ammonia flow begins and the movable discharge orifice housing descends at the same rate as does the ammonia level within the vessel whereby the aqueous ammonia discharge rate is maintained at a constant value up to the time that the tank has completely emptied.

The foregoing description of the apparatus of this invention is not intended to limit the use of the apparatus to the dispensing of any particular liquid for it is generally applicable to all liquids which are desirably discharged at a constant flow rate. Obviously the apparatus is of general utility in the dispensing of virtually any liquid.

As described in the drawing all the moving parts of the present apparatus are situated on the outside of the vessel in readily accessible positions for easy lubrication and maintenance. Thus corrosive liquids for example are handled in this apparatus without adverse effects on the moving elements thereof.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. An apparatus for dispensing liquids from a storage vessel at constant rates in spite of a falling liquid level within said vessel which comprises a storage vessel for liquid to be dispensed, an inlet thereto for filling said vessel, an outlet opening from a low point of said vessel, a movable orifice, said orifice being disposed outside of and adjacent said vessel, a flexible discharge conduit communicating said outlet with the upstream side of said orifice, means for conducting the liquid stream from the downstream side of said orifice, a vent conduit opening into said last-named means at a point adjacent the downstream side of said orifice, a suspension means for said movable orifice, a float within said vessel for detecting the position of said liquid level therein, and means communicating said suspension means with said float so as to maintain said movable orifice a fixed and predetermined distance below said liquid level during liquid discharge.

2. A liquid storage and dispensing apparatus adapted to deliver a liquid at substantially constant volumetric liquid discharge rates in spite of a falling liquid level within said apparatus which comprises in combination a liquid storage vessel, an inlet for filling said vessel, a liquid outlet opening from below the liquid level therein, a vertically movable orifice housing, an orifice disposed therein intermediate the ends of said housing, a flexible discharge conduit communicating said liquid outlet with said orifice housing at a point upstream from said orifice, a liquid delivery opening from said orifice housing at a point downstream from said orifice, a suspension means for said movable orifice housing, said suspension means being adjustable to position said orifice housing at a predetermined distance below the liquid level within said vessel, and a weighted buoyant float disposed within said vessel at said liquid level and adapted to follow the dropping liquid level upon liquid delivery and by its weight to pay out said suspension means for said orifice housing at a rate equal to that at which said float and said liquid level drop to maintain said orifice at said predetermined distance below said liquid level and thus maintain the liquid discharge rate through said orifice at a constant value.

3. An apparatus according to claim 2 in combination with a vent conduit communicating the atmosphere with said orifice housing at a point downstream from said orifice to prevent siphoning effects in said delivery conduit from disturbing the constant hydrostatic head of liquid acting at said orifice.

4. A liquid storage and dispensing apparatus adapted to deliver a liquid at substantially constant volumetric liquid discharge rates in spite of a falling liquid level within said apparatus which comprises in combination a liquid storage vessel, an inlet for filling said vessel, a liquid outlet opening from below the liquid level therein, a vertically movable orifice housing, an orifice disposed therein intermediate the ends of said housing, a flexible discharge conduit communicating said liquid outlet wth said orifice housing at a point upstream from said orifice, a liquid delivery opening from said orifice housing at a point downstream from said orifice, a vent conduit to the atmosphere opening from said orifice housing on the down-stream side of said orifice, a transverse rotatable drum disposed above said vessel, a suspension cable attached to and wound around one part of said drum and extending to said orifice housing as a suspension means therefor, said suspension cable being adjustable to fix said housing at a predetermined distance below said liquid level, a weighted buoyant float positioned within said vessel at said liquid level therein, and a cable extending from said float to a winding around and attachment to another part of said drum, said float being adapted by its weight to follow the liquid level as it drops and turn said transverse drum to unwind an equal distance of said suspension cable and maintain said orifice housing a constant predetermined distance below said liquid level whereby said liquid discharge rate is also maintained at a constant predetermined value.

5. An apparatus according to claim 4 wherein said transverse drum is provided with one drum portion which is rotatable with respect to the remainder thereof, a lock means for locking said drum portion to said remainder, said drum portion carrying the winding of said suspension cable for said orifice housing whereby said suspension means is made adjustable.

6. An apparatus according to claim 4 in combination with means for resisting any turning motion of said transverse drum until said liquid level and said float drop during liquid delivery.

7. An apparatus according to claim 6 wherein said means comprises a friction brake, the friction of which is overcome by the weight of said float exerted when buoyancy is lost due to a liquid level drop.

8. An apparatus according to claim 6 wherein said means comprises a weight suspended by a suspension line which is wound around said drum in the opposite direction from that of said cables attached to said orifice housing and to said float respectively, said weight counterbalancing the weight of said cables.

9. A method for discharging the liquid contents of a storage vessel at a substantially constant volumetric rate which comprises opening the outlet of the storage vessel so as to initiate liquid discharge therefrom through said outlet containing an orifice and cause a lowering of the liquid level in said storage vessel, movably suspending said orifice external to said vessel whereby it may be disposed at a distance below said liquid level, continuously detecting the lowering of said liquid level, venting the downstream side of said orifice to the atmosphere to prevent disturbance of the constant liquid head acting at said orifice by siphoning effects in said outlet downstream from said orifice, and lowering said orifice at an equal rate so as to mantain it at a fixed distance below said liquid level at all times whereby the liquid discharge rate is substantially constant.

References Cited in the file of this patent
UNITED STATES PATENTS

| | | |
|---|---|---|
| 2,010,363 | Hine | Aug. 6, 1935 |
| 2,082,149 | Cheavens | June 1, 1937 |
| 2,225,498 | Hollander | Dec. 17, 1940 |